United States Patent [19]

Galli

[11] 3,749,517
[45] July 31, 1973

[54] HELICOPTER BLADE WITH UNIVERSALLY REPLACEABLE POCKETS

[75] Inventor: Charles Galli, Trumbull, Ohio
[73] Assignee: United Aircraft Corporation, East Hartford, Conn.
[22] Filed: Oct. 6, 1971
[21] Appl. No.: 187,041

[52] U.S. Cl. .............................................. 416/226
[51] Int. Cl. ............................................ B64c 27/46
[58] Field of Search ........................... 416/226, 223

[56] References Cited
UNITED STATES PATENTS

| 2,620,884 | 12/1952 | Gluhareff | 416/226 |
| 2,754,915 | 7/1956 | Echeverria | 416/223 |
| 3,323,597 | 6/1967 | Longobardi et al. | 416/226 X |

FOREIGN PATENTS OR APPLICATIONS

| 920,962 | 1/1947 | France | 416/226 |
| 1,067,771 | 5/1967 | Great Britain | 416/226 |

Primary Examiner—Everette A. Powell, Jr.
Attorney—Vernon F. Hauschild

[57] ABSTRACT

To permit replacement of any of the individual helicopter blade trailing edge pockets, without respect to spar thickness at the span station of the pocket, a replacement pocket is provided which includes top and bottom skin members hinged at their after end to form the blade trailing edge, and tapered support members positioned along the blade chord between the skin members and with adjacent support members joined to opposite skin members and defining a gap between the support member and the skin member to which it is not attached, and selectively shaped shim members positioned in these gaps and joined to both support member and the skin member and being of selected height so that the forward end of the pocket member will be of a thickness substantially the same as the thickness of the blade spar to which it will attach.

14 Claims, 4 Drawing Figures

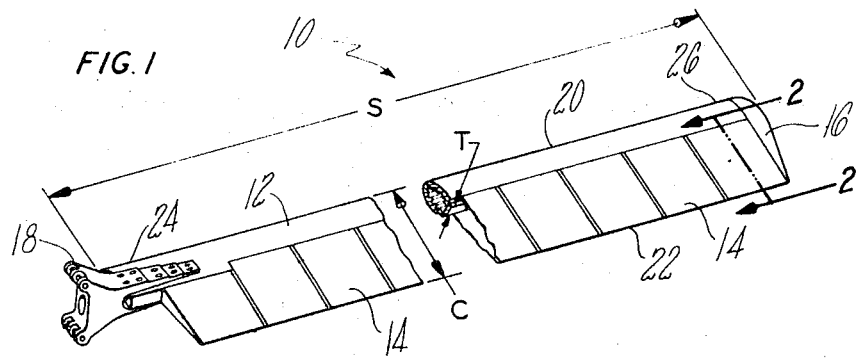
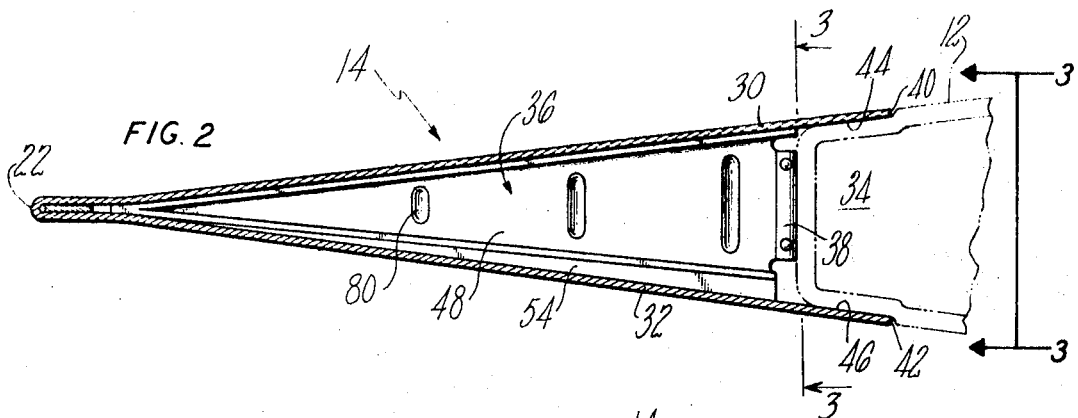
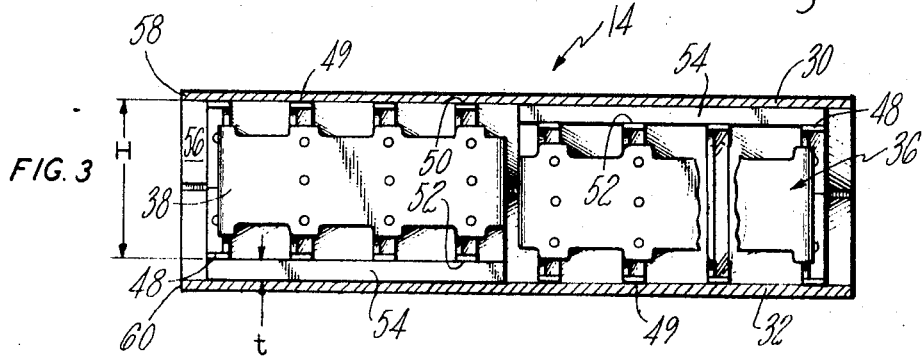
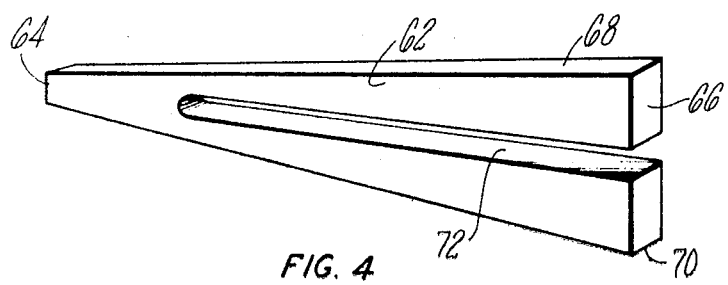

HELICOPTER BLADE WITH UNIVERSALLY REPLACEABLE POCKETS

BACKGROUND OF THE INVENTION

1. Field of the Invention

This invention relates to a helicopter blade of the type which utilize a leading edge structural spar and a plurality of trailing edge pockets connected thereto and positioned in side-by-side relationship along the blade span to cooperate with the spar in defining the blade cross-sectional shape or airfoil, and more particularly to replaceable trailing edge pockets which have universal application regardless of the spar thickness.

2. Description of the Prior Art

In the helicopter blade art, when a trailing edge pocket is damaged it has been necessary to remove the entire blade to an overhaul facility for repair of the damaged pocket. It has also been necessary to carry a sufficient number of replacement trailing edge pockets, of selected thickness, that any damaged pocket can be repaired. Since spars taper in thickness along the span dimension of individual blades, this requires either stock piling a large number of replacement blade pockets or being prepared to fabricate a replacement blade pocket of the desired thickness when such a pocket becomes damaged.

SUMMARY OF THE INVENTION

A primary object of the present invention is to provide a universally replaceable trailing edge pocket for a helicopter blade.

In accordance with the present invention, at least two tapered support members are positioned between the top and bottom skin of the pocket, with adjacent support members bonded to the opposite skins and forming a gap with the other skin. When a trailing edge pocket of a helicopter blade is damaged, the pocket so formed can be used to replace the damaged pocket by merely bonding the support member to the other skin and bonding both skins to the spar, provided that the total height of the trailing edge pocket so fabricated and the spar are substantially the same. If the spar is of greater thickness, such as at its inboard stations, a shim member of selected height is positioned between each support member and skin and bonded thereto, such that the height of the pocket member and the height of the spar are substantially the same and the two can be bonded together.

In accordance with a further aspect of the present invention, resilient seals which are positioned between adjacent pockets have their central portions removed so that the seal can be fitted between any two adjacent pockets, regardless of pocket height at the various stations along the blade chord.

BRIEF DESCRIPTION OF THE DRAWINGS

FIG. 1 is a perspective showing of a helicopter blade, partially broken away, to illustrate the environment of my invention.

FIG. 2 is a cross-sectional showing through a blade trailing edge pocket.

FIG. 3 is a view taken along line 3—3 of FIG. 2.

FIG. 4 is a perspective showing of the seal member which is positioned between adjacent trailing edge pockets.

DESCRIPTION OF THE PREFERRED EMBODIMENT

Referring to FIG. 1 we see helicopter blade 10 which includes structural spar 12 and a plurality of trailing edge pockets 14 which are positioned in side-by-side relationship, independent of one another, and each connected to spar 12. Tip cap 16 is connected to the outer most end of the spar and the outer most trailing edge pocket and attachment members, such as 18, connect blade 10 and the other identical blades to a rotor hub, not shown, so as to cooperate therewith in defining a helicopter rotor. Blade 10 may be of the type described in greater particularity in U.S. Pat. Nos. 2,754,917, 2,754,918 and 3,333,642. Blade 10 includes leading edge 20, trailing edge 22, blade chord C, blade span S and spar thickness T.

The spar 12 tapers in thickness between its thicker inner, inboard or root end 24 and its thinner outer, outboard, or tip end 26.

During operation, when a trailing edge pocket 14 becomes damaged, it is sometimes necessary that it be replaced. Under these circumstances, at the present time, it is necessary to remove the blade from the helicopter and transport it to a repair shop for replacement of the damaged individual pocket. This is very time consuming and incapacitates the entire helicopter not only for the period of repair but for the period of transportation to and from the repair shop, as well as the blade removal and reinstallation time. It is accordingly my objective to provide a single universal trailing edge pocket 14 which can be individually attached to spar 12 as a substitute for any damaged trailing edge pocket along the blade span, to reduce the number of spare blade assemblies which must be stocked, and to avoid the requirement of transporting the damaged blade to a repair shop for repair.

My universal trailing edge pocket 14 can best be described by viewing FIGS. 2 and 3. Each trailing edge pocket includes an upper skin member 30 and a lower skin member 32, which are joined or hinged at their after ends to define blade trailing edge 22. Skin members 30 and 32 are preferably one piece, bent to form the desired shape, with a spacer bonded to each. Skin members 30 and 32 define a substantially triangular chamber 34 therebetween. To provide support between skin members 30 and 32 of each trailing edge pocket 14, at least two support members 36 are positioned in chamber 34. Each support member 36 includes at its forward end a channel member 38, which is spaced rearwardly from the skin forward ends 40 and 42 so as to expose surfaces 44 and 46 to overlap the opposite sides of spar 12 for connecting thereto, preferably by a conventional bonding procedure. Support members 36 also include a plurality of chordwise extending, parallel rib members 48 and 49, each of which is connected by bonding or other conventional fasteners, to channel member 38 so as to form a unit therewith and each tapers uniformly rearwardly toward blade trailing edge 22 so as to cooperate with channel member 38 to define a substantially rectangular support member 36.

In my universal trailing edge pocket 14, adjacent support members 36, which extend juxtapositioned and parallel to the blade chord, are connected by any convenient method, such as bonding, to opposite skin members 30 or 32. For example, as best shown in FIG.

3, the support member 36 which is positioned to the right is connected to lower skin member 32 and support member 36 which is positioned to the left is connected to upper skin member 30.

When universal pocket 14 is to be used as a replacement for installations where the thickness T of the spar is equal substantially to the height H of support members 36, the replacement is made by connecting, preferably through a conventional bonding procedure, both sides, 50 and 52 of support members 36 to the top and bottom skin members 30 and 32, respectively, and joining spar 12 to surfaces 44 and 46 of support member 36. This will probably be the situation toward the outer end 26 of spar 12. As the spar thickens towards its inner end 24, the thickness T of the spar is greater than the height H of the support members 36. My universal pocket 14 then utilizes tapered shim members 54, together with support members 36 to serve as support for skin members 30 and 32. Shim members 54, which are thickest at their forward ends, are positioned between the free sides 52 of support members 36 and the adjacent skin members 30 or 32 and are selected thickness T so that the combined thickness of the support member 36 and the shim member 54, i.e., H+T is equal substantially to the thickness of the spar T at pocket-to-spar attachment area. Shim members 54 are connected, preferably by conventional bonding methods, to the free sides 52 of support members 36 and to the adjacent skin member 30 or 32, respectively.

It will therefore be seen that with my universal pocket, any damaged trailing edge pocket can be replaced in the field by the use of portable bonding equipment.

As best shown in FIG. 3, skin members 30 and 32 extend spanwise or laterally beyond the support members 36, thus providing an enclosed chamber 56 formed between the extending skin members 30 and 32 of adjacent pocket members 14. It is conventional practice to utilize a resilient seal member of the type taught in U. S. Pat. No. 2,620,884 to seal between the edges 58 and 60 of adjacent pockets 14. I propose to use a special resilient seal in my preferred embodiment and that seal is shown in FIG. 4. The seal 62 is, in fact, a wedge shaped block of resilient material, such as rubber, which tapers in thickness toward its trailing edge end 64 and is thickest at its leading or forward end 66. The upper and lower surfaces 68 and 70, respectively, are positioned between the inner surfaces of skin members 30 and 32 of adjacent pockets 14 and serve as a seal therebetween. My special seal 62 has a central cutout portion 72 through the center thereof, substantially along the central axis of the seal. This cutout portion 72 gives flexibility and resiliency to seal 62 so that the seal may be fitted to any convenient height or thickness dimension between adjacent pockets 14.

Preferably the various parts of my pocket 14 are made of lightweight material, such as aluminum, and stiffening bosses or lightening holes are used wherever possible. For example, such stiffening bosses 80 are located in end ribs 48 and similarly lightening holes (not shown) may be used in interior ribs 49 or in shim members 54, which may be either made of phenolic, plastic or aluminum.

I wish it to be understood that I do not desire to be limited to the exact details of construction shown and described, for obvious modifications will occur to a person skilled in the art.

I claim:

1. A helicopter blade having a leading edge, a trailing edge, a span, a chord, and a thickness and including:
   A. a spar member extending along the span of the blade and defining the blade leading edge and having a selected thickness,
   B. a plurality of independent pocket members positioned along the blade span in side-by-side relationship and connected to said spar and being shaped to cooperate therewith in defining the blade trailing edge, each of said pocket members having:
      1. a top skin member,
      2. a bottom skin member attached to said top skin member to define the blade trailing edge therewith and to define a chamber of substantially triangular cross section therebetween,
      3. at least two tapered support members positioned in said chamber parallel to the blade chord and juxtapositioned and with the first of said support members connected at one of its sides to said top skin and with the second of said support members connected at one of its sides to said bottom skin,
      4. and a shim member extending between the other side of each of said support members and the top or bottom skin to which the support member is not connected, and being connected to both said skin member and support member.

2. A blade according to claim 1 wherein said support member and said shim member are of selected total thickness to substantially equal the thickness of the spar.

3. A blade according to claim 1 wherein said pocket members are adhesively bonded to said spar member, said support members are adhesively bonded to said skin members, and said shim members are adhesively bonded to said support members and said skin members.

4. A blade according to claim 2 wherein said top and bottom skin members extend forwardly of said support members and said shim members to overlap and be connected to the opposite sides of the spar member.

5. A blade according to claim 2 and including a wedge shaped, resilient, seal member positioned between and extending into adjacent pocket members and having a central cutout portion such that the height of the seal member can be adjusted to match the local height dimension of the adjacent pocket members.

6. Apparatus according to claim 1 wherein said shim member is tapered and cooperates with said support member to define a substantially triangular support extending between and connected to said shim members.

7. A helicopter blade according to claim 1 wherein said support members include a channel member extending in a spanwise direction and a plurality of rib members connected to said channel member and shaped to taper rearwardly therefrom toward the blade trailing edge.

8. A helicopter blade according to claim 1 wherein said top and bottom skin members are a single continuous skin.

9. A helicopter blade having a leading edge, a trailing edge, a span, a chord, a thickness and including:
   A. a spar member extending along the span of the blade and defining the blade leading edge and having a selected thickness, B. a plurality of independent pocket members positioned along the blade span in side-by-side relationship and connected to said spar and being shaped to cooperate therewith in defining the blade trailing edge, each of said pocket members having:
1. a top skin member,
2. a bottom skin member attached to said top skin member to define the blade trailing edge therewith and to define a chamber of substantially triangular cross section therebetween,
3. a plurality of tapered members of selected individual thickness positioned in said chamber and bonded to one another and to said upper and lower skins so that the accumulative thickness of the pocket forward end is substantially the thickness of the spar after end so that the forward end of the top and bottom skin members may be connected to the opposite sides of said spar member.

10. A pocket member adapted to be positioned in side-by-side relationship with other such pocket members along the span of the blade and connected to the leading edge spar to cooperate therewith in defining the blade cross-sectional shape and including:
A. a top skin member,
B. a bottom skin member attached to said top skin member to define the blade trailing edge therewith and to define a chamber of substantially triangular cross section therebetween,
C. at least two tapered support members positioned in said chamber parallel to one another with the minimum taper end nearer the blade trailing edge and with the first of said support members connected at one of its sides to the top skin member and spaced from the bottom skin and with the second of said support members connected at one of its sides to the bottom skin and spaced from the top skin, and
D. a shim member extending between the other side of each of said support members and the top or bottom skin from which said channel member is spaced, and being connected to both said skin member and said support member.

11. A pocket member according to claim 10 wherein said support member and said shim member are of selected height to produce a selected total thickness of said pocket member forward end.

12. Apparatus according to claim 11 wherein said top and bottom skin members extend forward beyond said support members and said shim members.

13. A pocket member according to claim 10 wherein each of said support members includes a channel member extending spanwise of the blade and forming the forward portion of the support member and a plurality of tapering rib members extending substantially perpendicular to the channel member and connected thereto at their thickest ends and tapering toward the blade trailing edge.

14. A helicopter blade according to claim 10 wherein said top and bottom skin members are a single continuous skin.

* * * * *